Figure 1:
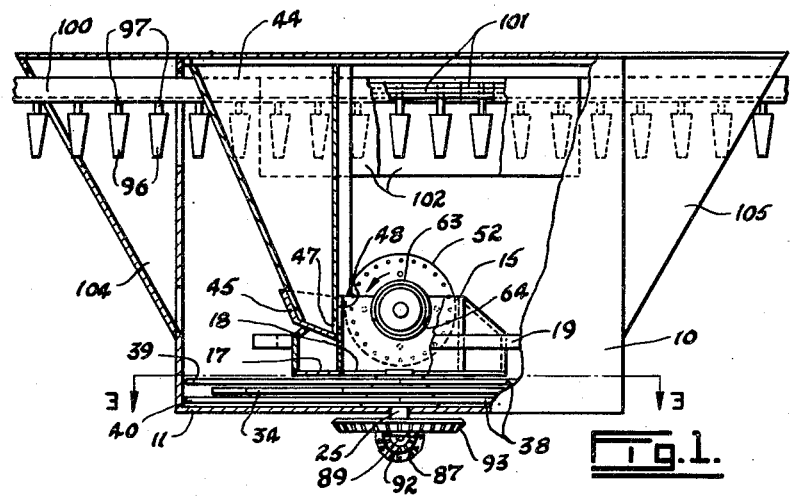

June 14, 1955     P. W. PARRY ET AL     2,710,588

MACHINE FOR APPLYING DRY COATINGS TO CONFECTIONS

Filed April 10, 1951     2 Sheets—Sheet 1

INVENTORS
PETER W. PARRY
JOHN G. MONTEITH
BY
Featherstonhaugh & Co.
ATTORNEYS

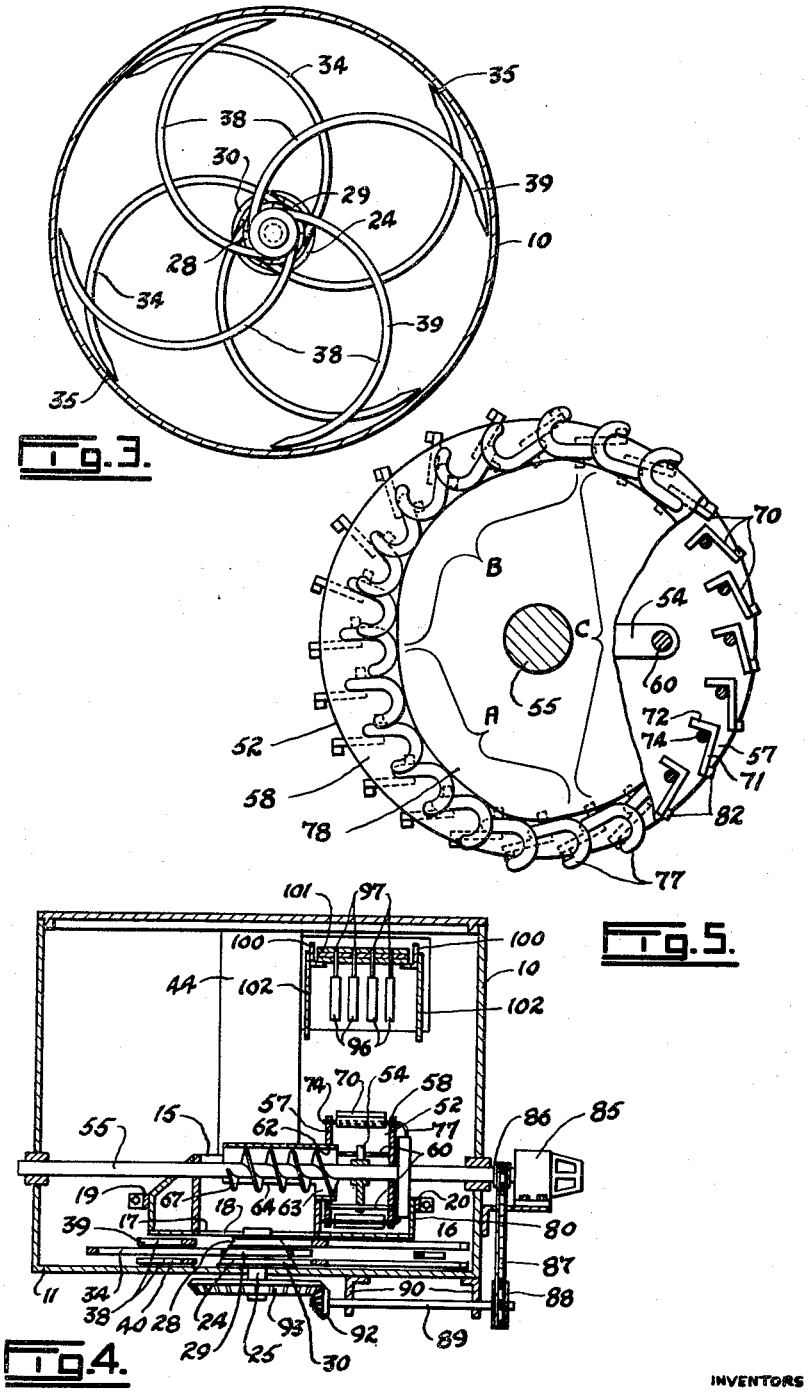

United States Patent Office 2,710,588
Patented June 14, 1955

2,710,588

MACHINE FOR APPLYING DRY COATINGS TO CONFECTIONS

Peter W. Parry and John G. Monteith, Vancouver, British Columbia, Canada

Application April 10, 1951, Serial No. 220,234

13 Claims. (Cl. 118—24)

This invention relates to machines for applying dry coatings to confections, such as coated and uncoated ice cream bars and the like. This machine is designed to spray particles of a dry coating material over the surfaces of the confections. Any type of dry coating material may be handled by this machine, such as broken up peanut brittle, shredded coconut, cookie crumbs, chopped nuts and the like.

Machines have been designed for applying dry coatings to confections. The trouble is that the coating material is discharged in all directions within a relatively large area in which the confections are located so that only a small percentage comes into contact with them. This means that the material usually is handled many times before it actually adheres to the confections. With most of the known machines for this purpose, the coating material is so pulverized during operation that it cannot satisfactorily coat the confections and cannot be handled properly. Others again are not adaptable to a production line process and as a result of this, dry coatings are seldom applied, except by hand, and this only on a small scale as it is a slow and costly process as well as being contrary to law in many areas, and there is a large demand for a machine which will do the job in a satisfactory production line manner.

The main object of the present invention is the provision of a machine for applying dry coating material to confections in which the material is continuously recirculated without being subjected to any pulverizing or great battering action.

Another object is the provision of a machine for applying an even coating to confections in a sanitary manner.

A further object is the provision of a machine having an automatic feed so that the coating material is fed thereto only when it is required.

Yet another object is the provision of a machine for applying dry coating material to ice cream bars without damaging or deforming the bars.

A still further object is the provision of a machine for applying dry coating material to confections that is readily adaptable both to mass production coating methods or small operations.

In this machine, the particles of coating material are discharged by a spraying rotor directly on to the confections and are not thrown in all directions, as is done in most of the known machines for this purpose. The material which does not adhere to the confections is gathered up in a gentle manner but in such a way that lumps are prevented from forming in the material. This gathered material is directed back to the rotor. Fresh material is added in accordance with the demand so that even though the machine may be running without any confections therein, new material will not be added until some of the old material is removed.

Figure 2:
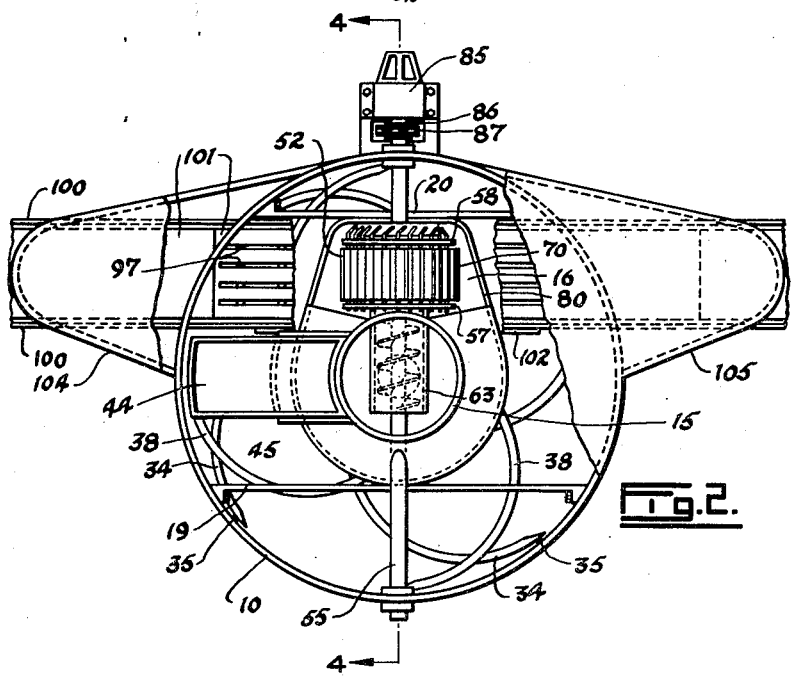

An example of this invention is illustrated in the accompanying drawings, in which, Figure 1 is a side elevation of the machine, partly in section, Figure 2 is a plan view of the machine, Figure 3 is a horizontal section taken substantially on the line 3—3 of Figure 1, Figure 4 is a vertical section taken substantially on the line 4—4 of Figure 2, and Figure 5 is an enlarged view, partly in section, of the spraying rotor.

Referring to the drawings, 10 is a casing of any desired shape. In this example, the casing is cylindrical in form and has a bottom 11. A container 15 is mounted above the bottom of the casing and has a tray 16 projecting outwardly therefrom, see Figures 2 and 4, at the level of the bottom 17 thereof. A large opening 18 is formed in the bottom 17 centrally thereof. This container and its tray are supported in the casing in any suitable manner, such as by means of bars 19 and 20 which extend across the casing and are secured to the wall thereof.

Suitable means is provided for gathering the coating material in particle form from the bottom of the casing 10 and directing it through the opening 18 into the container 15. This may be accomplished by means of a cone-shaped hub 24 mounted on a shaft 25 which extends through the bottom of the casing centrally thereof. This hub consists of three superimposed discs 28, 29 and 30. The upper and lower discs 28 and 30 are fixed to the shaft 25, while the middle disc 29 is freely mounted thereon. Each of a plurality of curved stationary arms 34, see Figure 3, is fixedly connected at its outer end at 35 to the casing wall 10, and at its inner end to the disc 29. These arms are spaced from each other and extend in a curve from the casing wall to the middle hub. A plurality of double arms 38 extend from the hub 24 in a curve outwardly towards the casing wall, the outer ends of these double arms terminating short of the wall. Each double arm consists of an upper section 39 and a lower section 40 connected at their inner ends to the discs 28 and 30, respectively. The double arms sweep outwardly in a curve from the conical hub in the opposite direction to the curve of the stationary arms 34. Actually, the arm sections 39 and 40 are located above and below the stationary arms. The upper end of the conical hub is positioned at or extends into the container opening 18, see Figure 4.

Coating material, which has been broken up, shredded or ground, may be placed in the casing 10, or it may be fed directly to the container 15 in any convenient manner. In this example, a hopper 44 is mounted on a support 45 carried by the wall of the container 15. The hopper may be adjustable vertically in its support, and it may have a discharge opening 47 at its lower end facing towards the container. An opening 48 is formed in the container wall in line with the hopper opening.

Suitable means is provided for spraying coating material from the container 15 upwardly in the casing 10. This is accomplished by means of a spraying rotor 52. This rotor consists of a spoked wheel 54 fixedly mounted on a main shaft 55 journalled in and extending through the wall of the casing 10, see Figure 4. Spaced side plates 57 and 58 are located on opposite sides of the wheel and connected thereto by a plurality of rods 60, which are secured to the outer ends of the wheel spokes. The plate 57 has a relatively large opening 62 formed therein centrally thereof through which a tube 63 extends. This tube extends from a point within the rotor through the wall of the container 15 and across the top thereof. The lower portion of a tube is cut away as at 64 within the container. A worm 67 is mounted on the main shaft 55 within the tube 63 so that it extends across the top of the container and into the rotor.

A plurality of L-shaped buckets 70 are provided for the spraying rotor, each bucket consisting of a base 71 and a wall 72 extending outwardly therefrom along one edge thereof. Each bucket has a shaft 74 extending thereacross at the point of juncture of the base 71 and rear wall 72, each shaft being journalled in the side plates 57 and 58 and bent into a curved cam follower 77 at one end thereof. These cam followers ride on a special cam disc 78. This disc is freely mounted on the shaft 55 and is prevented from turning in any suitable manner. This may be accomplished by providing a wall 80 around the tray 16, said wall being connected to the cam disc and to the bars 19 and 20, see Figure 4.

When the spraying rotor 52 is turned, the cam followers 77 ride along the surface of the cam disc 78. Suitable means is provided for maintaining the followers against the cam disc. This may be accomplished by means of a weight 82 mounted at the outer edge of the base of each bucket 70. The surface of the cam disc is so designed that in the section A of a circle, see Figure 5, the bases of the buckets are maintained in a substantially horizontal position and the buckets open outwardly from the rotor, at which time they are receiving or scooping up the coating material. In the section B, the buckets are given a quick flip into an inverted position, during which material therein is thrown outwardly and upwardly, and in the section C, the buckets are maintained in an inverted position.

The shafts 25 and 55 may be turned in any convenient manner. In this example, the shaft 55 is coupled to a gear head electric motor 85, and a sprocket 86 on the shaft is connected by a chain 87 to another sprocket 88 mounted on a shaft 89 carried by brackets 90 beneath the bottom on the casing 10. A bevel pinion 92 on this shaft meshes with a large bevel gear 93 mounted on the shaft 25. With this arrangement, the shaft 55 with the rotor 52 and worm 67 are rotated at a low speed, and the shaft 25 with the double arms 38 is rotated at a much slower speed.

In this example, the confections are ice cream bars 96 having sticks 97 protruding from one end thereof. These bars are moved horizontally through the casing 10 near its top in line with the periphery of the spraying rotor 52. This may be done in any convenient manner. One way of doing this is to provide spaced tracks 100 extending across the casing above the rotor upon which stick holders 101 are moved. These stick holders are well known in the trade and do not need to be described in detail here. The sticks 97 extend downwardly from the holders so that the ice cream bars are suspended below the latter. Deflector plates 102 may depend from the tracks on opposite sides of the stick holders within the casing. If desired, troughs 104 and 105 may be provided on the casing 10 across from each other and beneath the tracks 100. These troughs have sloping bottoms which are adapted to direct material falling therein into the casing 10.

In operation, the coating material is placed in the hopper 44. This material feeds through the openings 47 and 48 into the container 15. The worm 67 moves this material through the tube 63 into the interior of the spraying rotor 52 and it drops down on to the buckets 70 at the bottom of the rotor. When passing through the section B of their circular path of travel, the buckets open outwardly and the material is sprayed or thrown into the air above the rotor and on to the ice cream bars passing across the top of the casing 10. Some of this material strikes the inner surfaces of the plates 102 and is deflected into the spaces between the bars.

Only a percentage of the coated material adheres to the bars so that the remainder drops down on to the bottom 11 of the casing. The rotating double arms 38 move the material ahead of them, and as the material comes into contact with the stationary arms 34, which are curved in the opposite direction to the moving arms, this material is directed towards the centre of the machine until it hits the conical hub 24. The moving arms break up any lumps which may form without pulverizing the material. As the material builds up, it works its way up the sides of the cone into the container 15. Thus, the material is moved back to the container in a gentle manner where it is ready to be directed into the spraying rotor. This movement also keeps the material in the container moving upwardly towards the worm 67. In practice, the material is supplied to the machine at such a rate as to maintain the level in the container up to the worm therein.

The flow of material from the hopper is controlled by the level in the container since the material flows from the hopper only when the material in the container uncovers the feed opening 47. With this arrangement, there is no flow from the hopper when the material is not being applied to the bars. The level in the container is controlled by raising or lowering the hopper.

What we claim as our invention is:

1. Apparatus for spraying particles of a dry coating material on to confections, such as ice cream bars and the like, comprising a spraying rotor having a plurality of buckets open outwardly therefrom and arranged around its periphery, each bucket being pivotally mounted on the rotor, means for supporting confections in radial alignment with and spaced above the periphery of the rotor, means for supplying coating particles to the buckets, and tipping means for flipping each bucket during rotation of the rotor in the direction of said rotation as the bucket moves towards the confections to spray coating particles in a generally radial direction on to the latter.

2. Apparatus as claimed in claim 1 in which each bucket is L-shaped in cross section and has a base and a rear wall, said rear wall preventing coating particles from falling inwardly of the rotor.

3. Apparatus as claimed in claim 2 in which each bucket is pivotally mounted on the rotor at the point of juncture of its base and rear wall.

4. Apparatus as claimed in claim 1 in which the tipping means comprises a cam mounted adjacent the rotor and a cam follower connected to each bucket riding on the cam, said cam being designed to flip the buckets over at a predetermined point during rotation of the rotor.

5. Apparatus for spraying particles of a dry coating material on to confections, such as ice cream bars and the like, comprising a casing having a bottom, a horizontal shaft above the casing bottom, means for rotating the shaft, a spraying rotor mounted on the shaft above the casing bottom, means for supporting confections in the casing spaced above the bottom thereof and in radial alignment with and spaced from the periphery of the rotor, a plurality of buckets arranged around the rotor periphery and opening outwardly therefrom for spraying coating material under centrifugal force on to the confections during rotation of the rotor, and means for continuously supplying coating material to the rotor buckets.

6. Apparatus as claimed in claim 5 in which each bucket is pivotally mounted on the rotor.

7. Apparatus as claimed in claim 6 in which each bucket is L-shaped in cross section and consists of a bottom and rear wall, said bucket being pivotally mounted at the point of juncture of the base and rear wall.

8. Apparatus as claimed in claim 6 including means for flipping each bucket over during rotation of the rotor and as the bucket approaches the confections.

9. Apparatus for spraying particles of a dry coating material on to confections, such as ice cream bars and the like, comprising a spraying rotor, a plurality of buckets having discharge openings therein pivotally mounted on the rotor and arranged around the periphery thereof, means for supporting confections in radial alignment with and spaced above the periphery of the rotor, means for pivoting the buckets to direct the openings thereof outwardly from the rotor when said buckets are away from the confections, feeding means for directing coating particles to the buckets as they open outwardly, and tipping means for flipping each bucket in the direction of rotation of the rotor as said bucket moves towards the confections to spray coating particles in a generally radial direction on to the latter.

10. Apparatus for spraying particles of a dry coating material on to confections, such as ice cream bars and the like, comprising a spraying rotor having spaced side plates, a plurality of shafts carried by the plates arranged around the axis of the rotor parallel therewith, an open bucket mounted on each shaft, said buckets being swingable relative to the rotor side plates, means for rotating the rotor, means for supporting confections in radial alignment with and spaced above the periphery of the rotor plates, means for pivoting the buckets to direct the openings thereof outwardly from the rotor when said buckets are away from the confections, feeding means for directing coating particles between the plates to the buckets as they open outwardly, and tipping means for flipping each bucket in the direction of rotation of the rotor as said bucket moves towards the confections to spray coating particles in a generally radial direction on to the latter.

11. Apparatus for spraying particles of a dry coating material on to confections, such as ice cream bars and the like, comprising a spraying rotor having spaced side plates, a plurality of shafts carried by the plates arranged around the axis of the rotor parallel therewith, an L-shaped bucket mounted on each shaft, each of said buckets having a substantially flat base, said buckets being swingable relative to the rotor side plates, means for rotating the rotor, means for supporting confections above the rotor in radial alignment therewith and spaced from the periphery of the rotor plates, means for pivoting the buckets into positions with the bases thereof arranged substantially radially of the rotor when said buckets are away from the confections, feeding means for directing coating particles between the plates on to the bases of the buckets as said bases move with the radial positions, and tipping means for flipping each bucket upwardly in the direction of rotation of the rotor as said bucket moves towards the confections to spray coating particles in a generally radial direction on to the latter.

12. Apparatus as claimed in claim 11 in which each bucket is fixed to its shaft and the latter is journalled in the rotor side plates, and the tipping means comprises a cam mounted adjacent the rotor, and a cam follower connected to each shaft outside the rotor riding on the cam, said cam being shaped to flip the buckets in the direction of rotation as they approach the confections.

13. Apparatus as claimed in claim 11 in which each bucket is fixed to its shaft at the inner edge of the base thereof and the shaft is journalled in the rotor sides, and the tipping means comprises a cam disc mounted adjacent the rotor, a cam follower connected to each shaft outside the rotor riding on the cam surface, said surface being shaped to flip the buckets over in the direction of rotation as they approach the confections, and a weight near the outer edge of each bucket base to retain the follower thereof against the cam surface.

References Cited in the file of this patent

UNITED STATES PATENTS

| | | |
|---|---|---|
| 796,902 | Dunn | Aug. 8, 1905 |
| 1,488,356 | Linke | Mar. 25, 1924 |
| 1,591,506 | Blakeslee | July 6, 1926 |
| 1,736,799 | Planert | Nov. 26, 1929 |
| 1,747,168 | Holmstrom | Feb. 18, 1930 |
| 1,943,376 | Dilling | Jan. 16, 1934 |
| 2,248,643 | Rasmusson | July 8, 1941 |
| 2,294,221 | Bowen et al. | Aug. 25, 1942 |
| 2,417,614 | Ratcliff | Mar. 18, 1947 |
| 2,525,025 | Feil | Oct. 10, 1950 |
| 2,565,718 | Christensen | Aug. 28, 1951 |
| 2,577,433 | Robb | Dec. 4, 1951 |
| 2,583,767 | Daignas | Jan. 29, 1952 |